Sept. 4, 1962  J. H. VARTERASIAN  3,052,844

DOUBLE SCALE PHASE METER

Filed Aug. 20, 1959

INVENTOR.
*John H. Varterasian*
BY
*E. W. Christen*
ATTORNEY

United States Patent Office 3,052,844
Patented Sept. 4, 1962

3,052,844
DOUBLE SCALE PHASE METER
John H. Varterasian, Detroit, Mich., assignor to General Motors Corporation, Detroit, Mich., a corporation of Delaware
Filed Aug. 20, 1959, Ser. No. 835,096
3 Claims. (Cl. 324—83)

This invention relates to a phase meter and more particularly to a phase meter that will provide an unambiguous indication of phase angle over the entire range of 0° to 360°.

It is often necessary to provide an indication of the relative phase angle between two alternating signals. By using a standard phase detector such as a phase sensitive bridge or a discriminator circuit, it is easy to produce a D.C. output voltage that is representative of phase angle. The output of a standard phase detector, however, is inherently ambiguous in that the D.C. output will have the same value at two points in the range of phase angles from 0° to 360°. When it is necessary to provide an indication that covers the entire range of possible phase angles, then there must be some means for distinguishing the double valued output characteristics of a standard phase detector. Previously this has required the use of an oscilloscope or other device for visually indicating the actual phase relationship of the two signals that are under observation. This method would be unsatisfactory in that it would be time consuming and require an operator having considerable knowledge of the principles involved.

It is therefore the principal object of this invention to provide phase detection apparatus that will produce an indication of relative phase angle over the entire range of possible phase relationships. A further object of this invention is to provide a phase meter that is easily readable by an unskilled operator.

In accordance with one embodiment of this invention a phase detection device such as a phase sensitive bridge is used to produce an output voltage that is representative of the phase relationship between two input signals. The output of this phase detector is indicated on a meter or similar electrical indicating device. For any given output of the phase detector, there are two possible phase angles that could be associated therewith. A set of indicating elements is provided on the meter, therefore, to designate which of the two possible readings is valid for any particular phase angle. These indicating elements are energized by a second phase detector circuit which compares the same two input signals that were used in the first phase detector. One of the input signals, however, is displaced in phase by an angle of 90° with respect to that which was coupled to the input of the first phase detector. By employing these two sources of information, first a phase detector for comparing two signals, and second a phase detector for comparing the same signals when one of the signals is displaced by 90°, and then by displaying the output of one detector on a meter and the output of the other detector on a set of indicating elements associated with the meter, it is possible to obtain an indication of the exact phase angle.

The novel features that are considered characteristic of this invention are set forth in the appended claims. The invention itself will best be understood by the following description of one embodiment thereof when read in conjunction with the accompanying drawing, in which:

Figure 1:
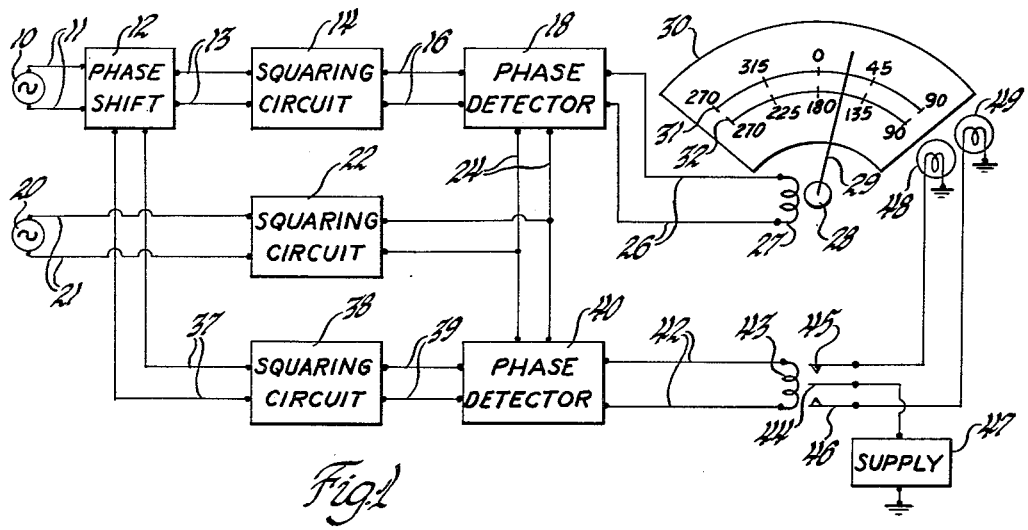
FIGURE 1 is a diagram of a phase detector system incorporating the invention.

Referring now to the drawings, wherein like reference numerals are used to designate like parts in all figures, and more particularly to FIGURE 1, a phase detector circuit is shown whereby the phase relationship between an unknown alternating signal is compared with a known reference signal. The sinusoidal input signal source 10 is coupled by a pair of conductors 11 to a phase shift circuit 12. The phase shift circuit 12 imparts a 90° leading phase shift to the input signal and may be any standard phase shifting device such as, for example, a resistance-capacitance circuit. The output of the circuit 12 is coupled by a pair of conductors 13 to a squaring circuit 14 which transforms the sine wave input signal into a square wave form having the same phase relationship. The circuit 14 may be any type of square wave generator, such as, for example, an overdriven push-pull amplifier. The square wave output is coupled by a pair of conductors 16 to a first phase detector 18 which may be a phase sensitive bridge circuit of the type shown in FIGURE 2 of the drawing. The phase detector 18 compares the phase angle of the square wave input from the squaring circuit 14 with a reference square wave that is developed from a reference signal source 20. The source 20 of alternating or sinusoidal signals is applied by a pair of conductors 21 to a squaring circuit 22 which may be similar in character to the squaring circuit 14. The output of circuit 22 is coupled to the input of the phase detector 18 by a pair of conductors 24. The phase detector 18 produces a D.C. output signal having a characteristic as shown in FIGURE 3a of the drawing. FIGURE 3a is a graph of the D.C. voltage output of the detector 18 plotted as a function of the phase angle between the input signal source 10 and the reference signal source 20.

The output of the detector 18 is coupled by a pair of conductors 26 to a coil 27 that drives a galvanometer movement 28. A needle 29 is driven by the galvanometer movement 28 and sweeps a meter face 30. The meter scale 30 is zero centered since the needle 20 will rest at the center of the scale when no current flows in the coil 27. The needle 29 will sweep to the far right of the meter face 30 when the current in the coil 27 is a positive maximum, corresponding to a voltage represented by a point 50 on the graph of FIGURE 3a. Current flowing in coil 27 corresponding to a point 51 in FIGURE 3a will result in a negative maximum scale reading as the needle 29 will sweep to the far left of the meter face 30. The meter face 30 is calibrated to include a first scale 31 which indicates the phase angles from —90° through +90°, or in other words, from 270° through 0 to +90°. Simultaneously, the needle 29 sweeps a second scale 32 which indicates the phase angle from 90° through 180° to 270°.

The circuit necessary for indicating which of the two scales 31, 32 that provides the valid reading at any particular time includes a second phase detector system that is similar to the one described above. A pair of conductors 37 connects the phase shift circuit 12 to a squaring circuit 38. The signal existing on the conductors 37 is in phase with the input signal from the source 10 but is lagging in phase by 90° with respect to the signal existing on the conductors 13. The squaring circuit 38 is similar in character to the circuits 14, 22 described above and produces a square wave output that is lagging in phase by 90° with respect to the square wave output of the circuit 14. The output of the squaring circuit 38 is coupled by a pair of conductors 39 to a second phase detector 40. This phase detector 40 may be of the same type as the first phase detector 18, as is shown in detail in FIGURE 2. The phase detector 40 compares the square wave that is in phase with the source 10 with the reference square wave input from the conductors 24 and produces a D.C. voltage output that has a characteristic of magnitude and polarity as shown in FIGURE 3b of the drawing. This characteristic is the same as that of FIGURE 3a except that it is displaced by 90°.

The unidirectional output of detector 40 is coupled by a pair of conductors 42 to a coil 43 of a double-pole, single-throw polarized relay. The relay coil 43 actuates an armature 44 that engages one of a pair of contacts 45, 46 depending upon the polarity of the current through the conductors 42. When the output of detector 40 is positive, then the armature 44 will engage the contact 45 which is serially connected between a supply source 47 and an indicating light 48. When the output of phase detector 40 is a negative voltage, then the armature 44 will engage the contact 46 which is in circuit between the source 47 and an indicating light 49. The source 47 may be any type of electrical supply that is adequate for energizing the lights 48, 49 or similar indicating devices. The indicating light 48 is associated with the scale 32 and may be located adjacent thereto or alternatively may be located behind the scale 32 and adapted to shine through the material of the scale to indicate that the scale 32 is to be read. The indicating light 49 is likewise associated with the scale 31 and serves to indicate that the scale 31 is to be read when the light 49 is energized. The small indicating lights 48, 49 could be replaced by apparatus including solenoids and mechanical linkages to provide an indication of which of the scales 31, 32 is valid by making only the valid scale appear on the meter while the invalid scale is stored in such a position that it is not visible when observing the meter.

In the operation of the system illustrated in FIGURE 1, it will be assumed that the signal from the source 10 is leading the reference signal from the source 20 by a phase angle of 45°. Due to the phase shift circuit 12, the sinusoidal voltage across the conductors 13 will be leading that across the conductors 21 by an angle of 135° and a like phase relationship will exist between the square wave potentials present across the conductors 16 and the conductors 24 at the input to the phase detector 18. The output of the detector 18 in this situation will be a positive voltage of such a magnitude as to deflect the needle 29 to the right to a reading of 45° on the scale 31, or, simultaneously, a reading of 135° on the scale 32. This positive voltage corresponds to a point 53 on the graph of FIGURE 3a and it will be noted that the same positive voltage is produced at a point 54 on the graph which represents a phase relationship of 135° between the sources 10 and 20. Thus it is necessary to provide some means for indicating which of the scales 31, 32 is to be taken as the valid reading of phase angle.

To provide this necessary scale discrimination, the phase detector 40 compares the phase of the voltage existing across the conductors 21 with that existing across the conductors 37 and produces an output voltage such as is shown in FIGURE 3b. The phase shift circuit 12 does not affect the input to the phase detector 40 so that the square wave potential existing across the conductors 39 is in phase with the source 10. The characteristic of the output of detector 40 will thus be displaced by 90° with respect to that of the detector 18. Therefore, with the 45° phase angle existing between the source 10 and the reference source 20, the output of the detector 40 will be a negative voltage as represented by a point 55 on the graph in FIGURE 3b. The armature 44 will engage the contact 46 and the supply source 47 will energize the indicating light 49 associated with the scale 31. Thus it will be apparent that the scale 31 provides the valid reading which is in this case 45°.

If the phase angle existing between the source 10 and the reference source 20 was +135°, the D.C. output of the detector 18 would be of the same magnitude as in the example above, that is, would correspond to a point 54 on the graph of FIGURE 3a. The output of the detector 40, however, would now be positive, corresponding to a point 56 on the graph of FIGURE 3b, and the armature 44 would engage the contact 45 so that the light 48 would be energized, indicating that the valid reading should be taken from the scale 32 and would be 135°.

Figure 2:
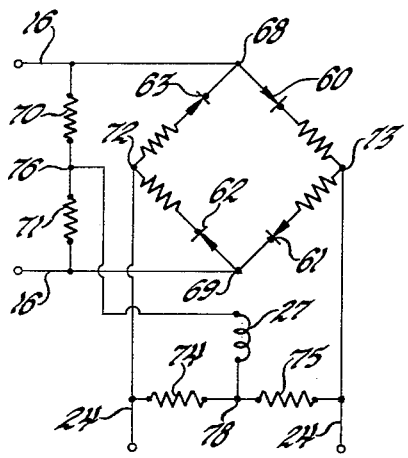
FIGURE 2 is a schematic diagram of a phase sensitive bridge circuit employed in the invention.
Figure 3:
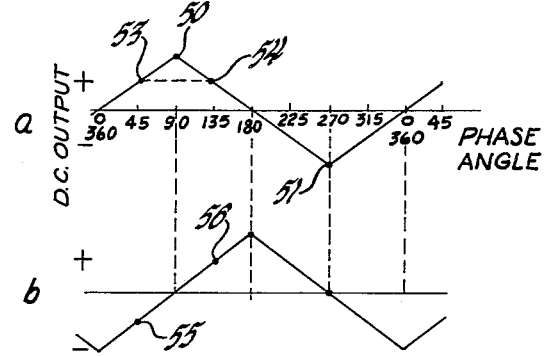
FIGURE 3 is a graphic representation of the output of the two phase sensitive bridge circuits employed in the invention.

FIGURE 2 illustrates a phase sensitive bridge circuit that may be used in the phase detectors 18 and 40. Included in the bridge circuit are four diode elements 60, 61, 62 and 63 and in series with each diode is a current limiting resistor. A square wave voltage that is balanced with respect to ground such as the signal obtained from squaring circuit 14 is applied by conductors 16 to the opposite terminals 68, 69 of the bridge circuit. A voltage divider comprising a pair of resistors 70, 71 of equal value is connected across the same opposite terminals 68, 69. A second square wave voltage that is balanced with respect to ground such as the one obtained from the squaring circuit 22 is applied by the conductors 24 to the remaining terminals 72, 73 of the bridge circuit. A voltage divider made up of a pair of equal resistors 74, 75 is connected across the terminals 72, 73. The load impedance, which may be the galvanometer coil 27, is connected between a juncture 76 and a juncture 78 on the two voltage divider circuits.

In the operation of the circuit shown in FIGURE 2, a condition will first be examined where the balanced square wave input voltages across the conductors 16 and conductors 24 are such that the terminal 68 is positive with respect to the terminal 69 and the terminal 72 is positive with respect to the terminal 73. If the peak-to-peak magnitudes of the square wave voltages are substantially equal, then in this condition only the diode 60 will be conductive. Since the terminal 68 is positive with respect to the juncture 76, current will flow through the diode 60, the terminal 73, the resistor 75, the load 27, and into the juncture 76. This produces a negative current in the load 27. If the polarities of the inputs 16, 24 were reversed, that is, if the terminal 69 was positive with respect to the terminal 68 and the terminal 73 was positive with respect to the terminal 72, then only the diode 62 would conduct and current would flow from the terminal 69 to the juncture 76, again resulting in negative current through the load 29. It is thus seen that when the square wave voltages existing on the conductors 16 and 24 are in phase opposition, then a maximum negative current flows through the load.

An examination of the operation of the phase detector of FIGURE 2 when the phase angle between the square wave existing across the conductors 16 and that across the conductors 24 is plus or minus 90° will show that the average current through the load 27 will be zero. When an in-phase relationship exists between the square wave potentials, a positive maximum in load current will flow. It can thus be seen that the phase shift circuit 12 is necessary to obtain an output of phase detector 18 having a characteristic as shown in FIG. 3a.

A similar output characteristic is obtained from the circuit of FIGURE 2 when the square wave applied to the conductors 24 is larger than that applied to the conductors 16, which is the normal mode of operation. Also, it is not necessary to use a square wave input to the conductors 24 since a large sine wave input produces satisfactory results. If the squaring circuits 14, 22, 38 were omitted entirely the system would still perform the same function although linearity and definition would be reduced.

It is not necessary in this invention to use the zero center meter scale 30 as is illustrated. A galvanometer movement which registered 0° at the far left of the scale and registered 180° at the far right will provide a similar indication. In such a system the first scale would read from 0 to 180° and the second scale would indicate the phase angles from 180° through 360°. It would be necessary to change the position of phase shift circuit 12 if this configuration of the meter scale was employed.

The same output characteristics of the system would be obtained if the unknown signal input 10 and the reference signal input 20 were reversed. This system could also be used to indicate the relative phase angle between two unknown signals rather than between a reference signal and one unknown signal as is illustrated above.

Although this invention has been described with respect to a particular embodiment thereof, it is not to be so limited as changes and modifications may be made therein which are within the full intended scope of the invention as defined by the appended claims.

What I claim as my invention is:

1. In apparatus for detecting and visually indicating the phase angle, a first phase detector connected to receive a first signal and a second signal and adapted to produce a unidirectional output voltage having a magnitude and polarity dependent upon the phase relationship between said first and second signals, a meter for providing a visual indication of said output voltage, a first scale and a second scale located on said meter, said meter having a single indicating element adapted to sweep said first and second scales simultaneously, each of said first and second scales covering two quadrants of phase angle whereby said meter provides an indication of the entire range of 360° of phase angle, said first scale including a quadrant of phase angle between 0° of phase angle and 90° of phase angle and another quadrant of phase angle between 270° of phase angle and 360° of phase angle, said second scale including a quadrant of phase angle between 90° of phase angle and 180° of phase angle and another quadrant of phase angle between 180° of phase angle and 270° of phase angle, said first and second scales having a zero center corresponding with 0° of phase angle on said first scale and 180° of phase angle on said second scale, said indicating element positioned at zero center of said first and second scales when at rest and adapted to sweep said first and second scales in a direction indicative of 90° of phase angle on said first and second scales when the unidirectional output voltage is of positive polarity and to sweep said first and second scales in a direction indicative of 270° of phase angle on said first and second scales when the unidirectional output voltage is of negative polarity, a second phase detector connected to receive said first signal and a third signal that is displaced in phase by ninety degrees with respect to said second signal and to produce a second unidirectional output voltage having a polarity dependent upon the phase relationship between said first and third signals, first visual indicating means associated with said first scale, second visual indicating means associated with said second scale, and means responsive to the polarity of said second output voltage for energizing said first indicating means when said output voltage is of one polarity and for energizing said second indicating means when said second output voltage is of the other polarity.

2. Phase detection apparatus including a first source of a first square wave voltage and a second source of a second square wave voltage, a first phase detector operatively connected to said first and second sources and adapted to produce a first output having a magnitude and polarity dependent upon the phase angle between said first and second square wave voltages, a meter having galvanometer coil energized by said first output, said meter including an indicating element actuated by said galvanometer coil and adapted to simultaneously sweep a first scale and a second scale, each of said first and second scales covering two quadrants of phase angle whereby said meter provides an indication of the entire range of 360° of phase angle, said first scale including a quadrant of phase angle between 0° of phase angle and 90° of phase angle and another quadrant of phase angle between 270° of phase angle and 360° of phase angle, said second scale including a quadrant of phase angle between 90° of phase angle and 180° of phase angle and another quadrant of phase angle between 180° of phase angle and 270° of phase angle, said first and second scales having a zero center corresponding with 0° of phase angle on said first scale and 180° of phase angle on said second scale, said indicating element positioned at zero center of said first and second scales when at rest and adapted to sweep said first and second scales in a direction indicative of 90° of phase angle on said first and second scales when said first output is of positive polarity and to sweep said first and second scales in a direction indicative of 270° of phase angle on said first and second scales when said first output voltage is of negative polarity, a second phase detector connected to said first source and to a third source of a third square wave voltage, said third square wave voltage being displaced in phase by ninety degrees with respect to said second square wave voltage, said second phase detector being adapted to produce a second output having a polarity dependent upon the phase angle between said first and third square wave voltages, a first indicating device associated with said first scale, a second indicating device associated with said second scale, and electrical means connected to receive said second output from said second phase detector and adapted to activate said first indicating device when said second output is positive and to activate said second indicating device when said second output is negative.

3. Phase detection apparatus including a first source of a first square wave voltage and a second source of a second square wave voltage, a first phase sensitive bridge operatively connected to said first and second sources and adapted to produce a first unidirectional voltage having a magnitude and polarity dependent upon the phase angle between said first and second square wave voltages, a meter having a galvanometer coil energized by said first unidirectional voltage, said meter including an indicating needle driven by said galvanometer coil and adapted to indicate the magnitude and polarity of said first unidirectional voltage, a first scale and a second scale positioned adjacent said needle to be simultaneously swept thereby, each of said first and second scales covering two quadrants of phase angle whereby said meter provides an indication of the entire range of 360° of phase angle, said first scale including a quadrant of phase angle between 0° of phase angle and 90° of phase angle and another quadrant of phase angle between 270° of phase angle and 360° of phase angle, said second scale including a quadrant of phase angle between 90° of phase angle and 180° of phase angle and another quadrant of phase angle between 180° of phase angle and 270° of phase angle, said first and second scales having a zero center corresponding with 0° of phase angle on said first scale and 180° of phase angle on said second scale, said indicating element positioned at zero center on said first and second scales when at rest and adapted to sweep said first and second scales in a direction indicative of 90° of phase angle on said first and second scales when the first unidirectional voltage is of positive polarity and to sweep said first and second scales in the direction indicative of 270° of phase angle on said first and second scales when the first unidirectional voltage is of negative polarity, a second phase detector connected to said first source and to a third source of a third square wave voltage, said third square wave voltage lagging in phase by ninety degrees with respect to said second square wave voltage, said second phase detector being adapted to produce a second unidirectional voltage having a polarity dependent upon the phase angle between said first and third square wave voltages, a first indicating light associated with said first scale, a second indicating light associated with said second scale, a relay coil connected to receive said second unidirectional voltage, double-pole, single-throw relay contacts operatively connected to said relay coil and adapted to close a first circuit including said first indicating light when said second unidirectional voltage is positive and to close a second circuit including said second indicating light when said second unidirectional voltage is negative.

References Cited in the file of this patent

UNITED STATES PATENTS

| | | |
|---|---|---|
| 1,916,782 | Crossley | July 4, 1933 |
| 2,512,330 | Hendrich | June 20, 1950 |
| 2,625,589 | Houghton | Jan. 13, 1953 |
| 2,725,528 | Werner | Nov. 29, 1955 |
| 2,760,155 | Kelly | Aug. 21, 1956 |
| 2,858,425 | Gordon | Oct. 28, 1958 |
| 2,904,683 | Meyer | Sept. 15, 1959 |

FOREIGN PATENTS

| | | |
|---|---|---|
| 575,594 | Great Britain | Feb. 25, 1946 |
| 701,941 | Great Britain | Jan. 6, 1954 |
| 336,900 | Switzerland | Apr. 30, 1959 |

OTHER REFERENCES

"An Electronic Phasemeter," article in Proceedings of the I.R.E. Waves and Electronics Section, February 1949, pages 207–210.